(12) United States Patent
Gentry

(10) Patent No.: US 6,394,706 B1
(45) Date of Patent: May 28, 2002

(54) SEA WALL REVETMENT SYSTEM

(75) Inventor: David W. Gentry, Naples, FL (US)

(73) Assignee: Blue Marlin Filter, Inc., Marco Island, FL (US)

(*) Notice: Subject to any disclaimer, the term of this patent is extended or adjusted under 35 U.S.C. 154(b) by 0 days.

(21) Appl. No.: 09/584,450

(22) Filed: May 31, 2000

Related U.S. Application Data

(63) Continuation-in-part of application No. 09/201,949, filed on Dec. 1, 1998, now abandoned.

(51) Int. Cl.[7] ............................................. E02D 29/02
(52) U.S. Cl. ..................... 405/284; 405/285; 405/286; 405/31
(58) Field of Search ............................... 405/284, 285, 405/286, 262, 31, 32, 15, 287

(56) References Cited

U.S. PATENT DOCUMENTS

| | | | |
|---|---|---|---|
| 1,360,767 A | | 11/1920 | Lacaze |
| 3,118,282 A | | 1/1964 | Jarlan |
| 3,726,950 A | | 4/1973 | Turzillo |
| 3,953,979 A | | 5/1976 | Kurose |
| 4,370,075 A | | 1/1983 | Scales |
| 4,391,557 A | | 7/1983 | Hilfiker et al. |
| 4,426,176 A | | 1/1984 | Terada |
| 4,465,398 A | | 8/1984 | Knudsen |
| 4,502,815 A | | 3/1985 | Scales et al. |
| 4,655,637 A | | 4/1987 | Vignocchi |
| 4,666,334 A | | 5/1987 | Karaus |
| 4,728,225 A | | 3/1988 | Brandl et al. |
| 4,911,585 A | | 3/1990 | Vidal et al. |
| 4,913,595 A | | 4/1990 | Creter, Jr. et al. |
| 4,952,097 A | | 8/1990 | Kulchin |
| 4,956,951 A | | 9/1990 | Kannankeril |
| 5,108,223 A | | 4/1992 | Folgado |
| 5,125,765 A | | 6/1992 | Verble |
| 5,176,466 A | | 1/1993 | Camfield |
| 5,190,413 A | * | 3/1993 | Carey .......................... 405/286 |
| 5,425,600 A | | 6/1995 | Gordon |
| 5,435,669 A | * | 7/1995 | Weber .......................... 405/284 |
| 5,536,112 A | | 7/1996 | Oertel, II |
| 5,588,784 A | * | 12/1996 | Brandl et al. ................ 405/262 |
| 5,641,244 A | | 6/1997 | Bestmann |

FOREIGN PATENT DOCUMENTS

| | | |
|---|---|---|
| GB | 2042605 | 9/1980 |
| JP | 58-83732 | 5/1983 |

* cited by examiner

*Primary Examiner*—David Bagnell
*Assistant Examiner*—Frederick L. Lagman
(74) *Attorney, Agent, or Firm*—Hahn, Loeser & Parks, LLP

(57) ABSTRACT

A system and process are provided for repairing a sea wall and precluding erosion drainage from occurring on the landward side of the sea wall when a filter material provided at a plurality of weep holes in the wall and at expansion and contraction gaps between wall elements degenerates. The system of invention includes a pipe-like conduit, open at both of its ends; a cap-like protective structure that is insertable over an end of said conduit; a filter assembly comprised of a sleeve-like enclosure and a filter which is situated within said sleeve-like enclosure; and an a rod-like implement insertable within said pipe-like conduit and engageable with said sleeve-like enclosure. The process of the invention comprises the steps of reaming each of the weep holes with a drill so as to clear each of the holes of any accumulation of debris; scraping each of the gaps and an area of the sea wall extending to the left and right of each of the gaps so as to remove any barnacles or other foreign objects which may have become adhered to the gaps and the nearby sea wall surface; sealing each of the gaps with a hydraulic cement; installing one of the pipe-like conduits in each of the previously reamed weep holes; releasably fastening the sleeve-like enclosure containing the filter to the rod-like implement; inserting the rod-like implement and the sleeve-like enclosure into the pipe-like conduit and sliding the sleeve-like enclosure along the inside of the pipe-like conduit until it is positioned at the landward side of the sea wall; unfastening the rod-like implement from the sleeve-like enclosure; and withdrawing the rod-like implement from the pipe-like conduit.

40 Claims, 6 Drawing Sheets

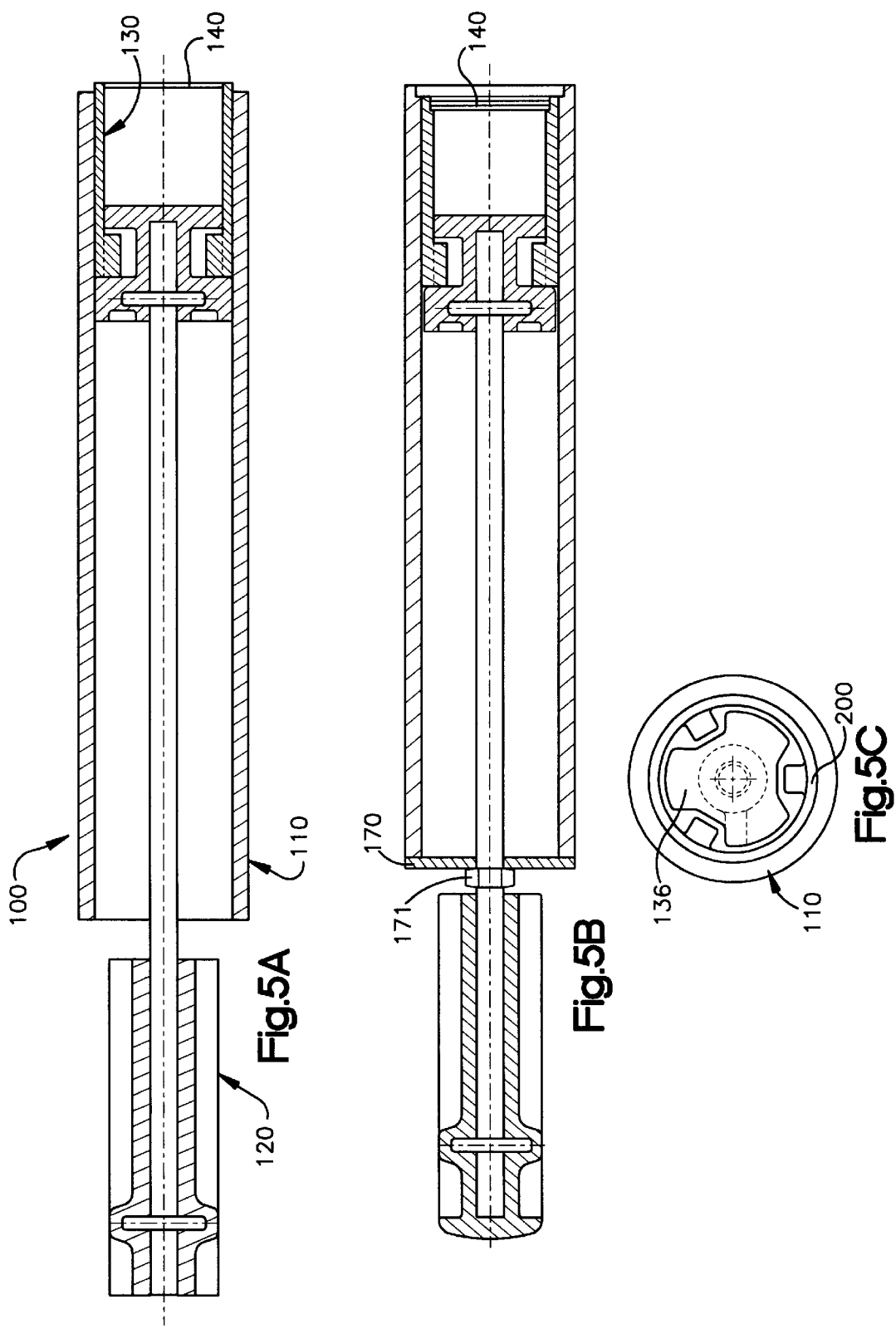

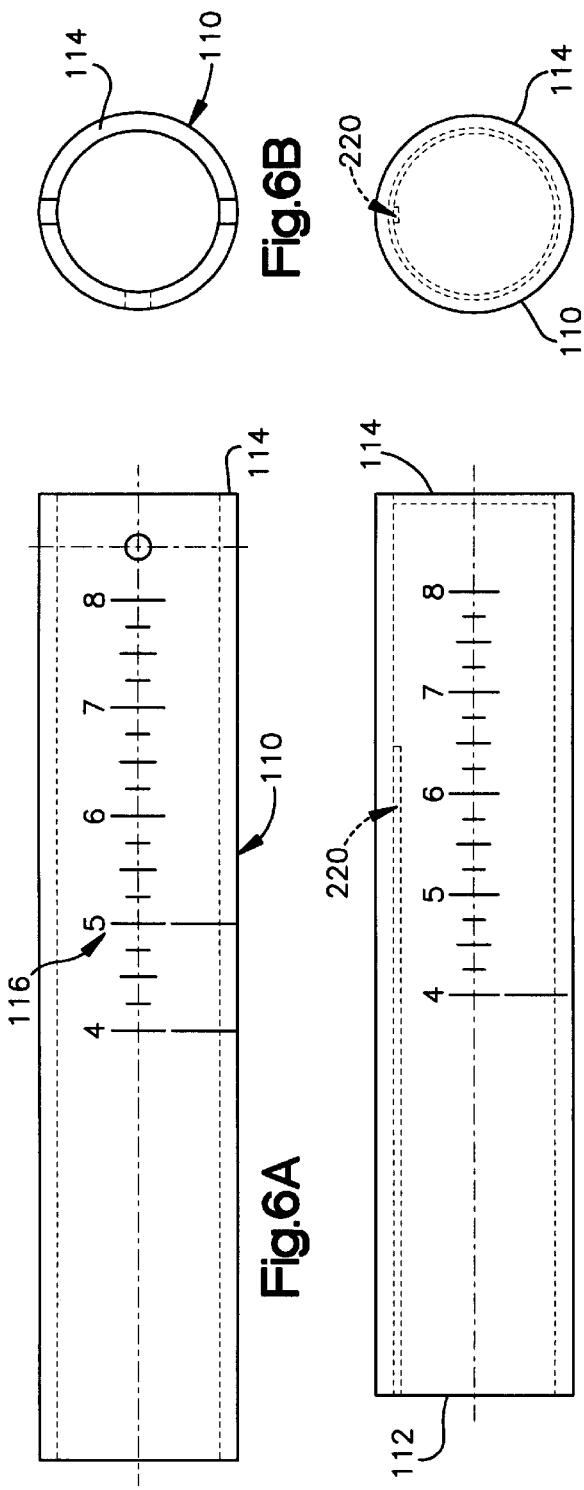
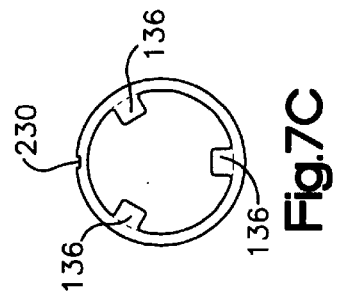
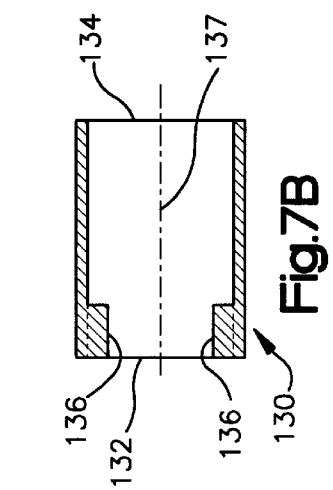
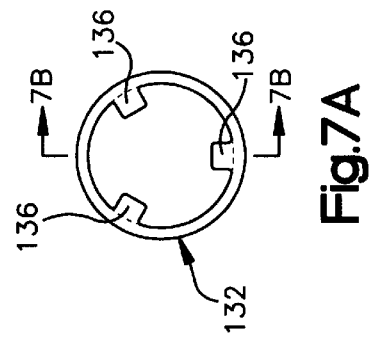

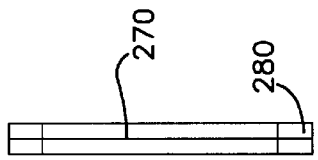
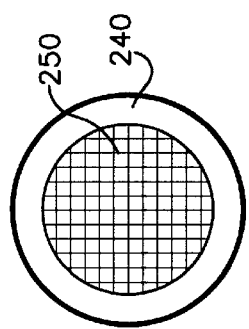
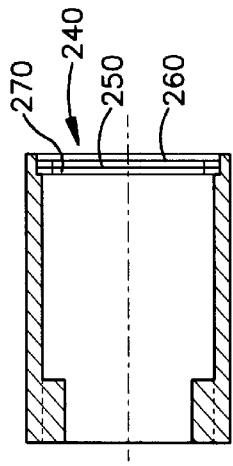
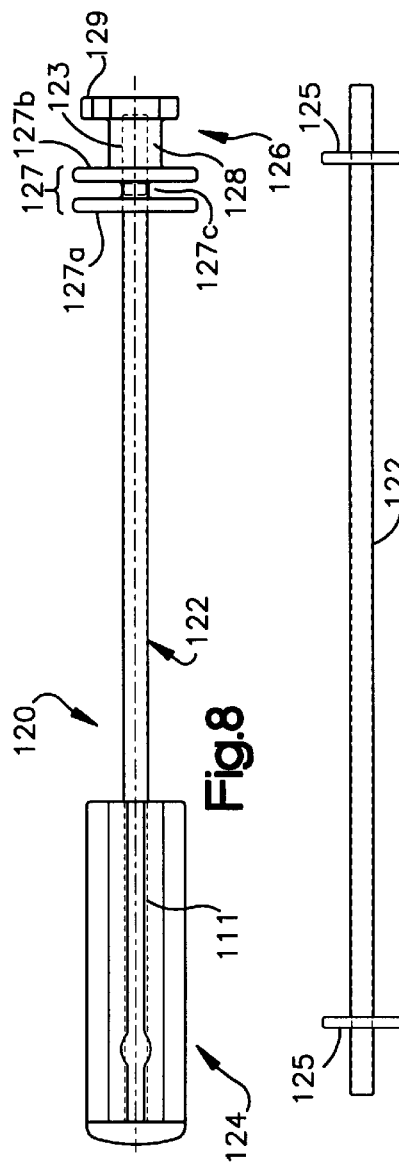
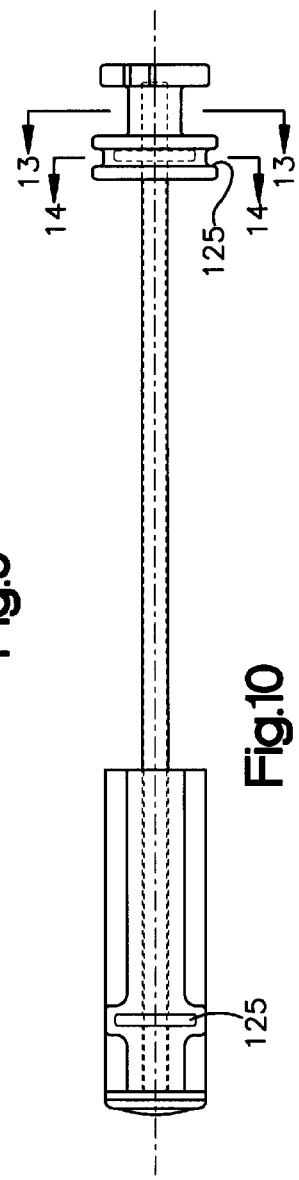
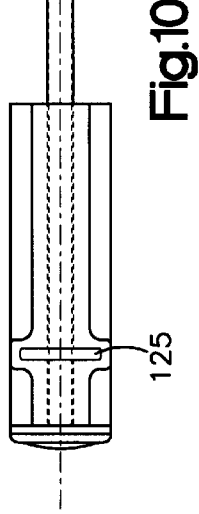
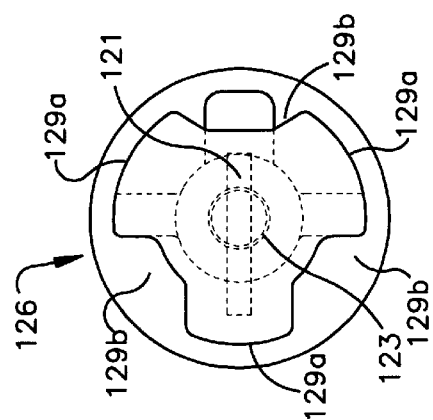

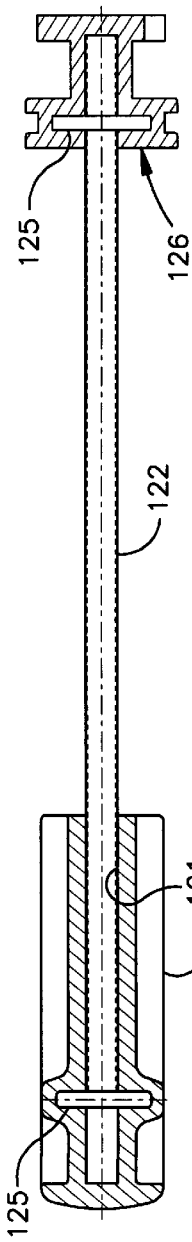
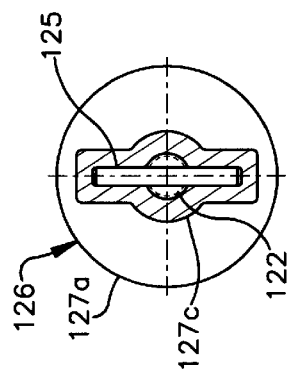
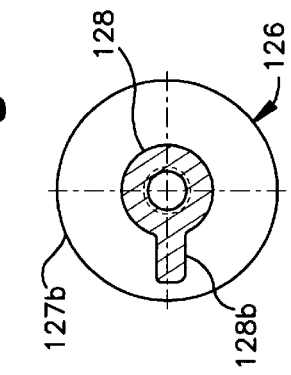
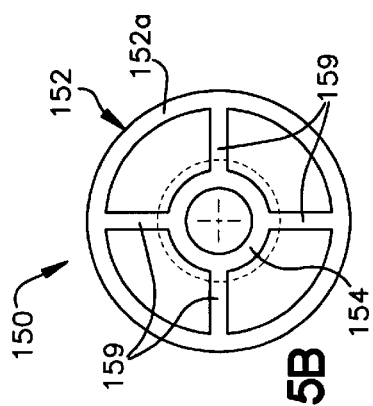
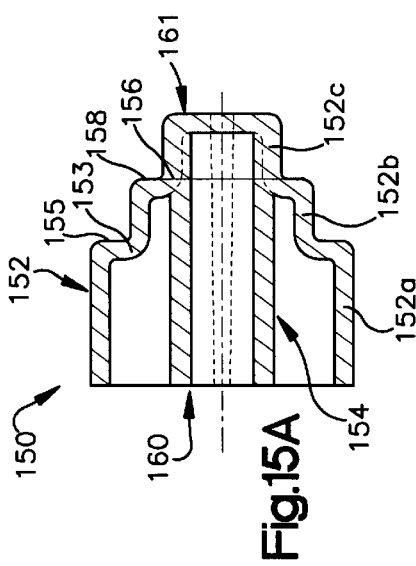

SEA WALL REVETMENT SYSTEM

This application is a continuation-in-part of application Ser. No. 09/201,949, filed Dec. 1, 1998, now abandoned.

FIELD OF THE INVENTION

The present invention relates generally to sea walls, and more specifically, to a method and system for repairing sea walls and preventing erosion drainage from occurring on the landward side of the sea wall.

BACKGROUND OF THE INVENTION

Many areas adjacent to naturally-occurring and man-made bodies of water are bordered by sea walls. Sea walls, when adequately designed and constructed, serve to protect waterfront property and improvements located thereon against wave attack and serve to stabilize the shoreline. Even with appropriate design and construction features, sea walls have been known to fail and fall into bodies of water because of the passage of time, strong winds, heavy rains, erosion, corrosion, high and low tides and other reasons. Therefore, sea walls must be protected against the action of the elements not only in front of the wall, but also behind it. Posterior wall protection is particularly necessary to counter erosion of soil, caused by hydrostatic pressure buildup which can result from waves lapping over the top of the wall and from ground water and rain percolating through the soil and toward the wall.

A typical sea wall will be constructed of a number of stone or concrete slabs which are square or rectangular in form and which are positioned side-by-side along a shore line to form a continuous wall. In such formation, each of the slabs frequently will be vertically implanted along one of its sides into the bottom of the body of water and close to the water's edge. Slab implantation will usually be performed so that a gap is left between adjacent slabs. The primary purpose for leaving such a gap is to provide space for expansion and contraction of the slab elements as water, land and air temperatures vary daily and seasonally. Additional construction features of the slab-type sea wall include providing each wall element with an anchor system, a number of drainage holes and filter material. The anchor system, which typically extends from the wall element to the earthen embankment behind the wall element, serves to keep the element in its vertical orientation and in firm contact with the embankment. The drainage holes, or "weep holes" as they are sometimes called, are provided through the upper region of the wall element at horizontal intervals and function to permit drainage of water from within the embankment to the side of the wall facing the body of water. The filter material, which is sheet-like in appearance, is flatly laid along the entire length of the sea wall between the posterior surface of the wall and the embankment and is provided to resist erosion of embankment material as water flows from the embankment through the weep holes and the wall element gaps.

While the filter material can be expected to function satisfactorily for a period of time after the sea wall has been constructed, eventually the filter material adjacent to the weep holes and the gaps deteriorates and sink holes then can develop in the embankment behind the sea wall. If such sink holes are allowed to grow unchecked, one or more portions of the sea wall may fall into the body of water as the anchor system loses its footing in the embankment. Until the present time, the procedure available for averting such a sea wall failure involved excavation of the embankment to expose the deteriorated filter material, removal of that material, reinstallation of new filter material and replacement of the embankment. Such procedure has been found to be not only time-consuming, but also very costly, since more often than not, it is necessary to use heavy excavating machinery to carry out the process.

The present invention provides a novel process and system that may be employed to more quickly and easily repair a sea wall and halt erosion drainage damage at considerably lower costs than those encountered through practice of the previously available technique.

SUMMARY OF THE INVENTION

In accordance with a preferred embodiment of the invention, a new and useful system and process are provided for precluding erosion drainage from occurring on the landward side of a sea wall when a filter material provided at a plurality of weep holes in the wall and at expansion and contraction gaps between wall elements degenerates. The system of the present invention generally is comprised of: a pipe-like conduit, open at both of its ends and having an outside diameter that is substantially the same as, or slightly larger than, that of the weep holes; a removable cap-like protector means that is insertable over either of the ends of said conduit and used for a purpose as hereinafter set forth; a filter assembly comprising a sleeve-like enclosure having an outside diameter that is slightly smaller than the inside diameter of said conduit and having a first inside bore and a second inside bore, with the first inside bore being smaller in diameter than the second inside bore and a filter situated within said filter assembly or sleeve-like enclosure; and an a rod-like implement insertable within said pipe-like conduit and engageable with said sleeve-like enclosure. The process of the present invention generally comprises the steps of: reaming each of the weep holes with a drill so as to clear each of the holes of any accumulation of debris; scraping each of the gaps between the sea wall segments and an area of the sea wall extending to the left and right of each of the gaps so as to remove any barnacles or other foreign objects which may have become adhered to the gaps and the nearby sea wall surface; sealing each of the gaps with a hydraulic cement; installing one of the pipe-like conduits in each of the previously reamed weep holes by inserting one end of the pipe-like conduit into the opening of the weep hole and by applying the cap-like protector over the other end of the pipe-like conduit and then striking the cap-like protector with a hammer or any other suitable impact producing device to drive the pipe-like conduit into the weep hole; thereafter removing the cap-like protector from the pipe-like conduit; releasably fastening the sleeve-like enclosure containing the filter to the rod-like implement; inserting the rod-like implement and the sleeve-like enclosure into the pipe-like conduit and sliding the sleeve-like enclosure along the inside of the pipe-like conduit until it is positioned at the landward side of the sea wall; unfastening the rod-like implement from the sleeve-like enclosure; and withdrawing the rod-like implement from the pipe-like conduit.

In instances where, after the initial installation of the system of the present invention in accordance with above enumerated steps, the filter means contained in said sleeve-like enclosure attains a deteriorated, non-functional state, the process of the present invention will then further include the steps of: reinserting the rod-like tool into the pipe-like conduit; releasably fastening the rod-like tool to the sleeve-like enclosure containing the spent filter means; slidably withdrawing the rod-like tool and the sleeve-like enclosure from the pipe-like conduit; removing the spent filter means from the sleeve-like enclosure and inserting a new filter means therein; reinserting the sleeve-like enclosure containing the new filter means into the pipe-like conduit; unfastening the rod-like tool from the sleeve-like enclosure; and withdrawing the rod-like tool from the pipe-like conduit.

Unlike the previously available method for remedying erosion drainage, which has to be carried out on the landside of the sea wall, the process of the present invention can be implemented wholly from the side of the sea wall facing the body of water. This aspect of the present invention thus eliminates the need to excavate the embankment on the landside of the sea wall and does away with the prospects for having to use costly excavating equipment. Additionally, because the inventive process entails use of hydraulic cement which may be applied in the presence of water and the pipe-like conduit of the inventive system may be inserted into a weep hole opening regardless of its location, the present invention permits drainage erosion control work to be undertaken right in the body of water itself and without having to first pump water away from the front surface of the sea wall. The ability to perform the work in the water makes it possible to halt drainage erosion in a fraction of the time required to do so with the previously known process. Thus, it is an object of the present invention to provide a low cost system and process that precludes erosion drainage from occurring at gaps and at weep holes in a sea wall by eliminating the need to excavate an earthen embankment on the landside of the sea wall in order to expose and replace deteriorated filter material thereat.

It is a further object of the present invention to provide a highly efficient system and process that precludes erosion drainage from occurring at gaps and at weep holes in a sea wall by permitting remedial efforts to be carried out wholly from the side of a sea wall that faces a body of water and within the body of water itself.

These objects and others of the invention will become apparent in the following detailed description of the invention when considered in conjunction with the accompanying drawings.

BRIEF DESCRIPTION OF THE DRAWINGS

FIG. 5A is a side cross-sectional view of the first embodiment of an erosion drainage prevention system of the present invention;

FIG. 5B is a side cross-sectional view of the second embodiment of an erosion drainage prevention system of the present invention;

FIG. 5C is an end view of the second embodiment of an erosion drainage prevention system of the present invention, as illustrated in FIG. 5A;

FIG. 6A is a side view of a pipe-like conduit of the first embodiment of the present invention;

FIG. 6B is an end view of a pipe-like conduit of the first embodiment of the present invention illustrated in FIG. 6A;

FIG. 6C is a side cross-sectional view of the second embodiment of a pipe-like conduit of the present invention;

FIG. 6D is an end view of the second embodiment of a pipe-like conduit of the present invention, illustrated in FIG. 6C;

FIG. 7A is an end view of a sleeve-like enclosure of the first embodiment of the present invention;

FIG. 7B is a side cross-sectional view of a sleeve-like enclosure of the first embodiment of the present invention taken along line 7B—7B of FIG. 7A;

FIG. 7C is an end view of one end of the second embodiment of a sleeve-like enclosure of the present invention;

FIG. 7D is a side cross-sectional view of the second embodiment of a sleeve-like enclosure of the present invention;

FIG. 7E is an end view of a filter end of the second embodiment of a sleeve-like enclosure of the present invention;

FIG. 7F is a side view of a filter end of a sleeve-like enclosure of the second embodiment of the present invention;

FIG. 8 is a first side view of a rod-like implement of one embodiment of the system of the present invention;

FIG. 9 is a side view of a drive rod of one embodiment of a rod-like implement in the present invention without the handle portion;

FIG. 10 is a second side view of a rod-like implement of one embodiment of the present invention, taken at a position that is 90 degrees from that yielding the view provided in FIG. 8;

FIG. 11 is a side cross-sectional view of a rod-like implement as shown in FIG. 10;

FIG. 12 is an end view of a rod-like implement;

FIG. 13 is a cross-sectional end view of a rod-like implement taken along the line 13—13 of FIG. 10;

FIG. 14 is a cross-sectional end view of a rod-like implement taken along line 14—14 of FIG. 10; and FIG. 15A is a side cross-sectional view of a cap-like protective means of the preferred embodiment of the system of the present invention.

FIG. 15B is an end view of a cap-like protective means of the preferred embodiment of the system of the present invention.

DETAILED DESCRIPTION OF THE PREFERRED EMBODIMENT

Figure 1:
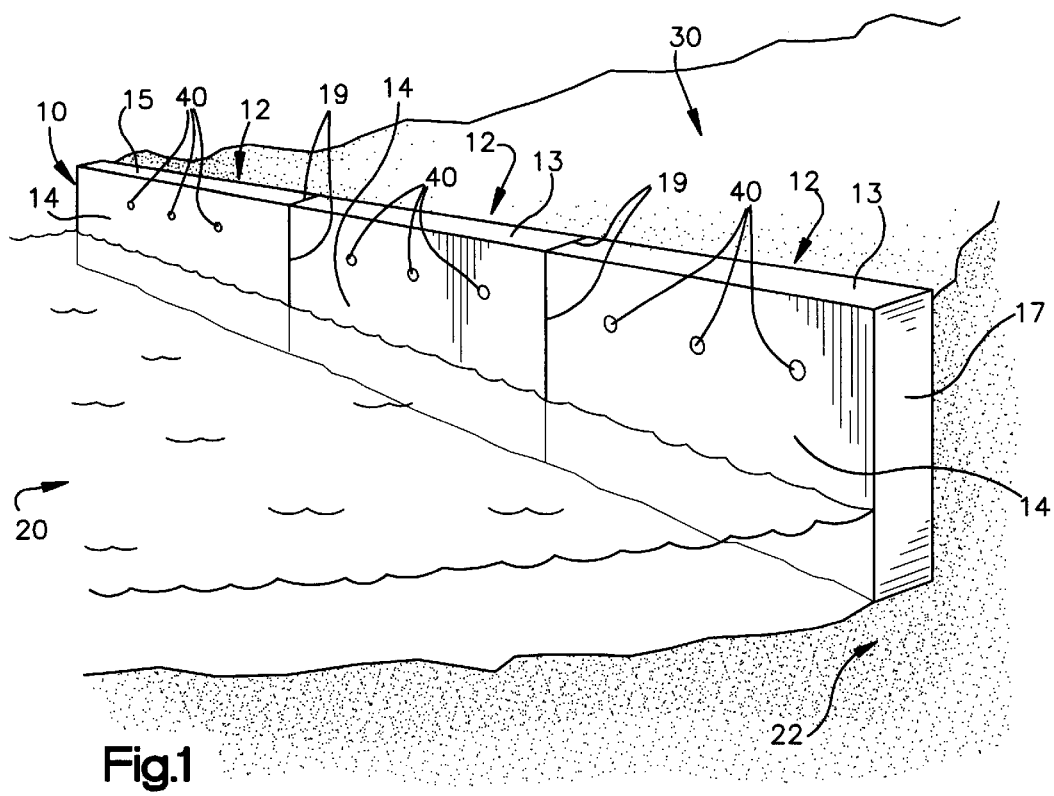
FIG. 1 is a perspective view of a frontal portion of a typical sea wall as it may appear situated along a shore line of a body of water and at an earthen embankment.
Figure 2:
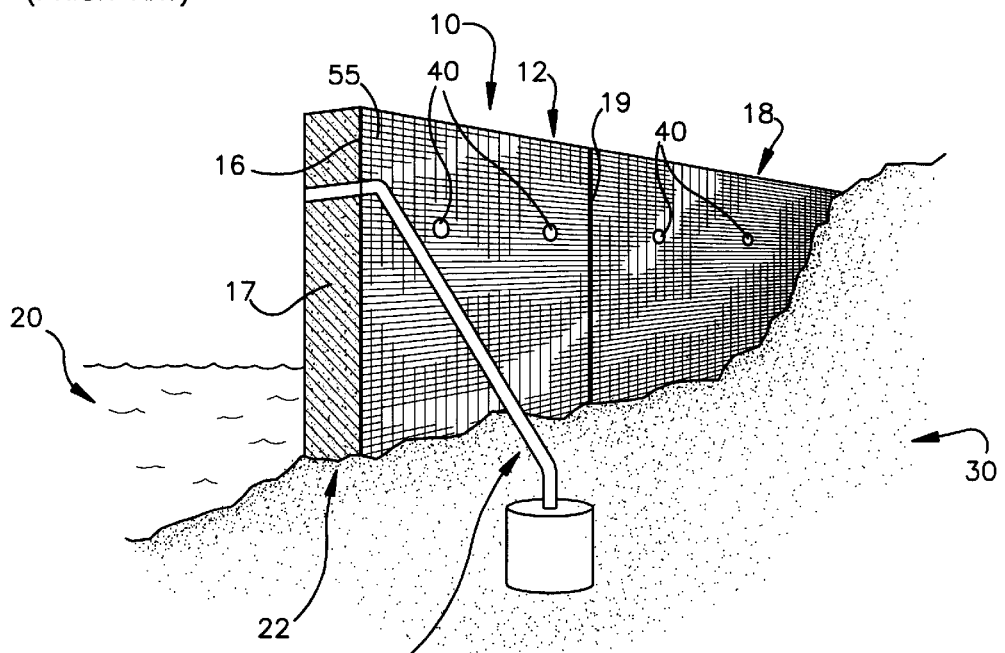
FIG. 2 is a perspective view of a landside portion of the sea wall of FIG. 1, as the sea wall portion would appear if a volume of the earthen embankment was not present.
Figure 3:
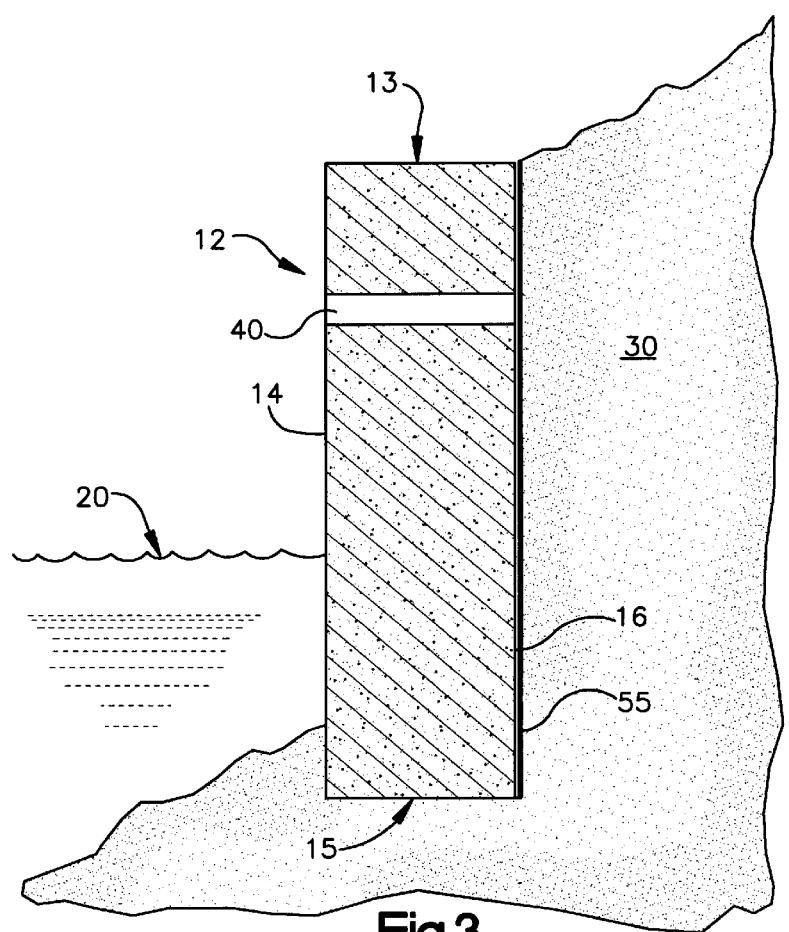
FIG. 3 is a side cross-sectional view of the sea wall portion taken through one of the typical weep holes shown in FIGS. 1 and 2.
Figure 4:
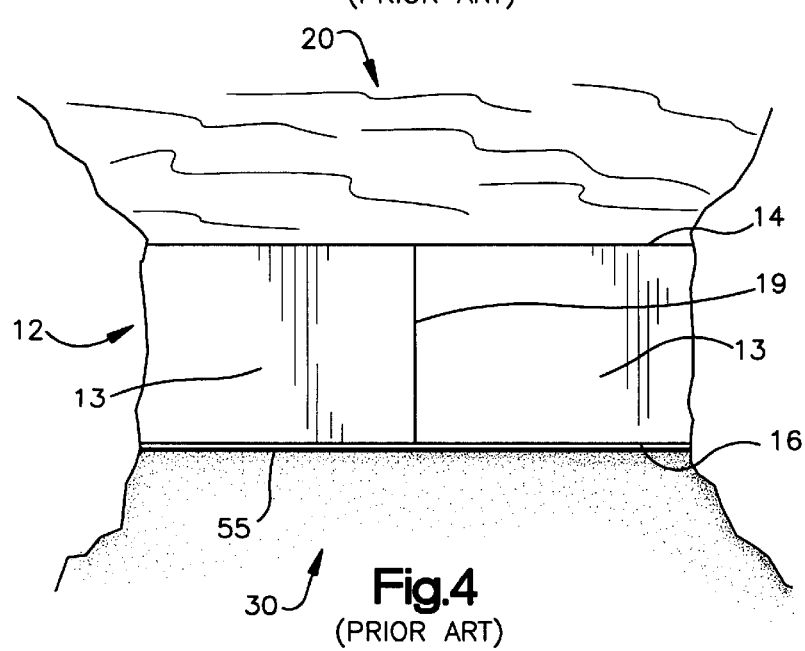
FIG. 4 is a top view of the sea wall portions of FIGS. 1 and 2 as the portions would appear at an expansion and contraction joint provided between the sea wall segments.

FIGS. 1 and 2 provide different perspective views of a portion of a typical sea wall with which the system and process of the present invention will be employed. In these figures, the sea wall portion is indicated generally by the reference numeral 10, a body of water is indicated by the by the number 20, and an earthen embankment is shown by the number 30. The sea wall 10 is comprised of a plurality of stone or concrete slabs 12 which can be square or rectangular in form. The slabs are positioned side-by-side and vertically implanted into the bed 22 of the body of water 20 to form the sea wall 10. Each of the slabs has a frontal face 14 that is directed toward the body of water 20, a posterior or landside face 16 that is directed toward the earthen embankment 30, a top side 13, bottom side 15 (not shown in FIGS. 1 and 2, but shown in FIG. 3) and two opposing vertical sides 17. Where two of the slabs 12 are abutted one against the other at vertical sides 17, a gap 19 is formed. The gap 19 serves to provide space between the adjacent slabs 12 for expansion and contraction as the temperature of the land, air and water in contact with the slabs 12 varies throughout the course of a day and on a seasonal basis. The slabs 12 are provided with a plurality of horizontally spaced drainage or weep holes 40 that have a circular cross section and, as is clearly shown in FIG. 3, extend across the complete width of the slab 12 from the frontal face 14 to the landside face 16. The weep holes 40 operate to allow water to flow from the embankment 30 toward the body of water 20 and thus relieve excess hydrostatic pressure which may accumulate behind the sea wall 10 from time to time. As also shown in FIG. 2, an anchor system, generally indicated by the reference numeral 50, will also typically be provided to stabilize the sea wall 10 and to help to maintain each of the slabs in a vertically upright position. One or more of the anchor systems 50 may be used to support each of the slabs 12. Additionally as may be seen in FIGS. 2, 3 and 4, the sea wall 10 will be provided with a sheet-like, fabric filter 55 which is flatly positioned between the landside 16 of the slabs 12 and the earthen embankment 30. It will be noted by reference particularly to FIGS. 3 and 4 that the sheet-like filter 55 will cover the weep holes 40 and the gaps 19. The fabric that comprises the filter 55 has properties that permit the passage of water but not soil through the filter 55 and thus the fabric allows the holes 40 and the gaps 19 to relieve hydrostatic pressure buildup in the embankment 30 without loss of the soil of the embankment 30 through the holes 40 and the gaps 19.

Deterioration of the filter 55, especially at or near any of the holes 40 and the gaps 19, has been known to result in erosion of the embankment 30 through drainage of soil laden water therethrough. Such erosion drainage, if allowed to continue, results in sink hole development behind the sea wall 10 and can cause the anchor system 50 to fail with one or more of the slabs 12 falling into the body of water 20.

FIG. 5A shows a cross-sectional view of a first embodiment of the system of the present invention which is employed to preclude the aforedescribed erosion drainage from occurring at the weep holes 40. The system, which is generally designated by the reference numeral 100, is comprised of a pipe-like conduit or revetment tube 110, a rod-like tool assembly 120, and a filter assembly. The filter assembly is comprised of a sleeve-like enclosure 130 and a filter 140. The revetment tube 110, which is also shown in FIGS. 6A–6D, in one embodiment, is open at both of its ends 112 and 114 and has a uniform circular cross section over its entire length. The length of the tube 110 is greater than the thickness of the slab 12 at the weep holes 40 by an amount that will allow it to protrude at least a short distance beyond the frontal face 14 when the tube is positioned in the weep holes in a manner as hereinafter described. Depending on the length of the tube, a length of approximately 4 inches may be adequate, but it is contemplated by the present invention that shorter or longer lengths may be used. In many applications, selecting the length of the tube 110 within a range of approximately 8 inches to approximately 9 inches will provide for a protruding length that is satisfactory; however, tube lengths of more or less than the stated range may also be selected if the thickness of the slab 12 so requires. The outside diameter of the tube 110 is substantially the same as or slightly larger than the diameter of the weep holes 40 in order to ensure that the tube 110 fits snugly into the weep holes 40. In some instances the diameter of the tube 110 will be in a range of approximately 1 inch to 2 inches; however, diameters outside this range may also be used if necessary or desired.

As clearly shown in FIG. 6A, the tube 110 may be provided with a measurement scale 116 running along the length of the outer surface of the tube 110. The purpose of the scale 116 is to facilitate installation of the tube 110 to a correct depth in the weep holes 40. In the preferred embodiment, the tube 110 will be produced from polyvinyl chloride material. Other suitable materials may also be used to produce the tube 110, however.

A second embodiment of the present invention includes a modified version of tube and sleeve-like enclosures. FIGS. 6C and 6D show this second embodiment, wherein the tube 110, is provided with a longitudinally extending ridge 220 on the inner wall of the tube. As is shown in FIGS. 7C and 7D, one embodiment of the sleeve-like enclosure 130 has a radially inward projecting, longitudinal groove 230 which corresponds to the ridge in the tube. In the embodiment shown, the ridge 220 does not extend along the entire length of the tube 110. In this embodiment, the ridge stops at a distance from the end 112 of tube 110. The sleeve-like enclosure 130 is inserted in the tube by matching up the groove 230 to the ridge 220 and sliding the sleeve-like enclosure 130 along the length of the tube 110. The ridge 220 preferably stops at a length from the end 112 of the tube 110 slightly greater than the length of the sleeve-like enclosure 130. In this way, the sleeve-like enclosure 130 can be turned so that the groove 230 is no longer lined up with the ridge 220 and thus, the sleeve-like enclosure 130 cannot inadvertently slide backwards out of the tube 110.

FIG. 7A and FIG. 7B show, respectively, an end view and a side cross-sectional view of one embodiment of the sleeve-like enclosure 130 of the filter assembly. The enclosure 130 has a thin-walled, circular cross section and is open at both of its ends 132 and 134. At the end 132, the enclosure 130 is provided on its inside periphery with a plurality of tab-like projections 136. In one embodiment of the invention, there are provided three projections 136 that, as clearly shown in FIG. 7A, are spaced equidistantly about the inner periphery of the enclosure 130 and that extend radially inward toward the central longitudinal axis 137 of the enclosure 130. As clearly shown in FIG. 7B, the projections 136 extend from the end 132 toward the end 134 of the enclosure 130 for a distance which, in one embodiment of the invention, is approximately equivalent to one-fourth of the overall length of the enclosure 130. Also, as shown in FIG. 7B, the wall thickness of the enclosure 130 diminishes steadily from the end 132 to the end 134 except in the immediate areas where the projections 136 are provided. As may be seen by reference to FIG. 5, the enclosure 130 has an outside diameter that is slightly smaller that the inside diameter of the tube-like conduit 110. The slightly smaller outside diameter of the enclosure 130 facilitates its installation and removal from the tube-like conduit 110 in the manner as is hereinafter described.

FIG. 8 shows a side view of one embodiment of the rod-like tool assembly 120. The tool assembly may be generally comprised of a rod 122 ; an elongated handle 124, and a fastening head 126. The rod may be threaded or smooth, depending on the mode of attachment to the handle and fastening head. According to one embodiment of the present invention, the handle and the fastening head may have a threaded central bore 121 partially therethrough into which a first end of the rod 122 may be received by the handle and a second end of the rod 122 is received by the fastening head. The overall length of the assembly 120 is preferably greater than the length of tube-like conduit 110 so that the elongated handle 124 will be graspable by the hand of a user. FIG. 9 provides a side view of the rod 122 and shows that, in one embodiment, a spring pin 125 may be provided which fits into a transverse bore at a location inward from the first and the second ends of the rod 122. As may be seen by reference to FIG. 10 and to FIG. 11, the handle 124 and the fastening head 126 each may be provided with a radially extending cross bore that passes through the central bores 121 and 123 and having a diameter which is slightly larger that the spring pin 125. In an assembled state of one embodiment of the rod-like tool 120, opposing ends of one of the spring pins 125 is received by the cross bore in the handle 124 and in the fastening head 126. The spring pins 125, when so received, act to prevent either clockwise or counter-clockwise rotation of the handle 124 and the fastening means 126 relative to the rod 122. It is contemplated by the present invention that other means of attaching the rod 120 to the handle 124 and fastening head 126 may be used including, but not limited to, using an adhesive material or other fastening means as are known in the art.

As indicated in FIG. 11 and as clearly shown in FIG. 12, the elongated handle 124 may be provided a means for a user to obtain a firm hand grasp for rotating the rod and the fastening head affixed thereto. For example, the handle 124 may be provided with a plurality of fin-like projections that extend longitudinally along the handle. The handle may also be provided with a rubber coating or rubber tabs affixed to the handle to provide a firm hand grip. Any other means known in the art may be used to provide a hand grasp on the handle of the present invention.

As shown in FIGS. 10 and 11, one embodiment of the fastening head 126, when viewed from the side may have a spool-like form comprised of: a base region 127; a central region 128; and a hub-like end region 129. The base region 127 may be comprised of a single a continuous piece or two disk like structures joined by a central member, or any other suitable base construction . As may be seen by reference to FIG. 12, which provides an end view of the fastening means 126, the hub-like end region 129 may be provided with a plurality of radially extending projections or tabs 129a that define therebetween a plurality of spaces 129b. In one embodiment of the invention there are provided three tabs 129a which are spaced equidistantly about the hub 129. As may be seen in FIG. 13 where a view of the fastening head 126 is provided along the line 13—13 of FIG. 10, the fastening head may further comprise a means for stopping rotation of the fastening head within the sleeve-like enclosure. One embodiment of the stop means comprises a structure 128b that extends longitudinally along the cylinder 128 toward the hub-like end region 129. The stop means may be integrally formed in the fastening head, or may be an attachable structure, such as a clip.

Referring back to FIGS. 7A and 7B which provide end and side cross-sectional views of the sleeve-like enclosure 130, it may be seen that the fastening head 126 may be caused to engage (and disengage) the enclosure 130 at the end 132 thereof. Engagement may be caused by: aligning the spaces 129b defined by the tabs 129a of the hub 129 with the projections 136 provided at the end 132 of the enclosure 130; inserting the hub 129 into the enclosure 130 until the end 132 of the enclosure 130 comes to rest against a top surface 127b of the base region 127 of the fastening head 126 (at such time the projections 136 will have become radially adjacent to the cylinder 128); and causing the projections 136 and the tabs 129a to rotate relative to each other. The engagement may further comprise rotating the rod and fastening head within the enclosure until a side of one of the projections 136 makes contact with the radially projecting stop 128b. At such point, as indicated in FIG. 5, all of the projections 136 of the enclosure 130 will be in radial alignment with the tabs 129a of the hub 129 and axial and longitudinal movement of the enclosure 130 relative to the fastening head 126 will be precluded. To disengage the enclosure 130 from the fastening head 126, the just described steps need only be followed in reverse order.

As also indicated in FIG. 5, the system 100 of the present invention also includes a filter 140. The filter 140 is comprised of a fabric material having the ability to permit the passage of water and other liquid substances from the embankment 30, through the filter 140 and into the weep holes 40. The fabric material of the filter 140 at the same time has a capability to prevent the soil making up the embankment 30 from being swept into the weep holes 40 by the water that flows into the same. In one embodiment of the system 100 of the present invention, the filter 140 is comprised of a tightly woven polypropylene fabric that fully covers the opening 134 of the sleeve-like enclosure 130. In another embodiment of the present invention shown in FIGS. 7D–7F, the filter may be attached to the sleeve-like enclosure by means of a filter ring assembly 240. The filter ring assembly 240 is comprised of an inner fabric bearing ring 270 which holds fabric filter material 250 and an outer open ring 260 which receives the inner fabric bearing ring 270 and is insertable into the end 134 of the sleeve-like enclosure. The outer open ring 260 may be secured to the end of the sleeve-enclosure 130 by any means including frictional engagement or adhesive materials as are known in the art.

In addition, as shown in FIGS. 5A, 5B and 5C, the system of the present invention, may also comprise a means for preventing the sleeve-like enclosure of the filter assembly from being pushed beyond the end 112 of the tube 110 upon insertion. In one embodiment of the present invention, the means for preventing the sleeve-like enclosure from being advanced too far in the tube comprises a washer 170 and nut 171 assembly secured to the rod-like implement 120. The washer 170 is preferably of a diameter greater than that of the tube 110, such that when the rod-like implement has been used to insert the sleeve-like enclosure the required distance into the tube 110, the washer 170 abuts against the end of tube 114 and prevents further advancement of the sleeve-like enclosure 130. In another embodiment, the means for stopping advancement of the sleeve-like enclosure is comprised of a retaining mechanism secured to the first end of said conduit which faces the landward side of the sear wall. The retaining mechanism should have the ability to prevent advancement of said filter assembly without substantially obstructing passage of water or other liquid materials through said filter assembly. The retaining mechanism may comprise a retaining ring 200 secured to end 112 of tube 110. The retaining mechanism may also be comprised of a plurality of tabs secured to the end 112 of the tube. The retaining mechanism 200 is preferably secured to the inner diameter of the tube so that the end 114 is flat and can be placed flush against an inner surface of the sea wall. As seen from the end view of the assembly in FIG. 5C, when the sleeve-like enclosure is inserted all the way into the tube, the sleeve-like enclosure will abut against the retaining ring 200 which prevents advancement of the sleeve-like enclosure beyond the end of the tube.

FIGS. 15A and 15B illustrate a cap-like protector 150 of the system 100 of the present invention. As will be noted by reference to FIG. 15A, the protector 150 has an multi-diameter, cylindrical outer portion 152 and a single, cylindrical diameter inner portion 154. The outer portion of cap has a bottom portion 300 and a top portion 310. The outer cylindrical portion 152 is comprised of a plurality of interconnected sections represented here by 152a, 152b and 152c. The section closest to the bottom of the cap 152a is the largest in diameter. The section at the top of the cap 152c is the smallest in diameter, and intermediate sections such as 152b have a diameter that is intermediate to the diameters of the outermost sections 152a and 152c. The diameter of the sections preferably increases from top to bottom of the outer cylindrical sphere. Sections 152a and 152b are interconnected at a first elbow-like segment 153 and define a first annular ledge 155. Similarly, the sections 152b and 152c are linked by the second elbow-like segment 156 and define a second annular ledge 158. As is shown in FIG. 15B, the inner cylindrical portion 154 is situated in concentrically within the outer cylindrical portion 152 and is provided with a plurality of fin-like support members 159. As viewed in FIG. 15A, the protector 150 will be inserted into the pipe-like conduit 110 so that one of the annular ledges 155–158 rests fully against the end 112 of the conduit 110. With the protector 150 so inserted into the end 112, a hammer or alternatively, a rod inserted into the inner cylindrical portion 154 and struck by a hammer, may be used to drive the conduit into the hole 40 without deforming the end 112.

Having described various embodiments of system 100 of the present invention, the process for using said systems to repair the sea wall 10 will now be provided. In some situations, the weep holes 40 may optionally be reamed inwardly from the frontal face 14 of the wall 10 with a drill in order to remove any debris accumulated in the holes 40, and if necessary, to increase the diameter of the holes 40 so that they are substantially the same as or only slightly smaller that the outside diameter of the pipe-like conduit 110. In addition, each of the gaps 19 and an area of the sea wall 10 extending to the left and right of each of the gaps 19 on the frontal face 14 may be scraped to remove any barnacles or other foreign objects which may have become adhered to the gaps 19 and the adjoining sea wall surface. Further, each of the scraped gaps 19 must be sealed with a hydraulic cement capable of being applied in the presence of water. One or more of the above steps may not be required before installing the system of the present invention.

To install the revetment system of the present invention, one of the pipe-like conduits 110 is installed into a weep hole 40 by aligning the end 114 of the conduit 110 with the weep hole 40, applying the cap-like protector over the end 112 of the conduit 110 and then striking the cap-like protective means 150 with a hammer or any other suitable impact producing device to drive the conduit 110 into the hole 40 until the end 114 is flushly positioned with respect to the landside face 16 of the wall slab 12 and the end 112 protrudes at least a short distance from the frontal face 14 of the wall slab 12. Alternatively, the conduit could be pushed into the wall by hand or driven in with a suitable impact producing device without use of the cap-like protector. If used, the cap-like protector should be removed from the end 112 of the conduit 110. The filter assembly including the sleeve-like enclosure 130 containing the fabric filter 140 may affixed to the fastening head 126 of the rod-like tool assembly 120 by engaging the tabs 136 and the projections 129a in the manner described hereinabove, or by any other suitable means. The rod-like tool assembly 120 and the sleeve-like enclosure 130 are inserted into the end 112 of the conduit 110 and the enclosure 130 is slidably moved within the conduit 110 until the end 134 of the enclosure 130 is positioned flushly with the end 114 of the conduit 110. In a second embodiment of the present invention where the tube contains a ridge and the sleeve-like enclosure contains a corresponding groove, the this step involves lining up the groove with the ridge so that the sleeve-like enclosure may slide into tube. In addition, in the embodiment in which the tube contains a retaining ring, the sleeve-like enclosure is slid into the tube until it abuts against the retaining ring and stops advancing. Alternatively, the enclosure may be slid into the conduit without the use of the rod-like implement. Once the enclosure is in place within the conduit, the sleeve-like enclosure 130 is disconnected from the rod-like tool assembly 120 by disengaging the tabs 136 and the projections 129a in the manner set forth hereinabove, or by any other suitable method. Lastly, the rod-like tool assembly 120 may be withdrawn from the pipe-like conduit 110 through the end 112.

Following the installation of the system 100 of the present invention according to the steps set forth in the preceding paragraph, the filter 140 contained in the enclosure 130 that was inserted into the conduit 110 will eventually reach a deteriorated, non-functional state. In such event, rejuvenating the system 100 becomes a simple matter of taking the following additional steps which also are considered to be included within the scope of the process of the present invention. The rod-like tool assembly is reintroduced into the conduit 110 from the end 112 thereof and advanced toward the sleeve-like enclosure 130. Second, the tool assembly 120 is fastened to the sleeve-like enclosure 130 containing the spent filter 140. The tool assembly 120 and the enclosure 130 with the spent filter 140 are withdrawn from the conduit 110 by sliding the enclosure 130 toward the end 112 of the conduit 110 and removing the enclosure 130 therefrom. In another embodiment, the sleeve like enclosure is rotated using the rod-like implement until the groove of the sleeve-like enclosure matches up with the ridge of the tube so that the enclosure may be slid out of the tube. Then, the spent filter 140 is unfastened and removed from the tool assembly 120 by disengaging the tabs 136 from the projections 129a. A new filter 140 may be applied to the tool assembly 120 and the new filter 140 is installed in conduit 110 by following the same steps described hereinabove for the initial installation of the filter 140.

Although the present invention has been described above in detail, the same is by way of illustration and example only and is not to be taken as a limitation on the present invention. Accordingly, the scope and content of the present invention are to be defined only by the terms of the appended claims.

What is claimed is:

1. A system for repairing a sea wall and preventing erosion drainage from occurring in an earthen embankment situated on a landward side of the sea wall, the system comprising:

a conduit for insertion into a weep hole connecting said landward side of said sea wall with an opposite frontal side of said sea wall, said conduit having a first conduit end provided with a first conduit opening and a second conduit end provided with a second conduit opening;

a means for protecting said conduit from deformation as said conduit is inserted into said weep hole;

a filter assembly for insertion into said conduit; and a tool assembly insertable within said conduit and removably attached to said filter assembly for inserting and removing said filter assembly from said conduit.

2. A system as claimed in claim 1, wherein said conduit is a pipe-like conduit having an outside diameter and an inside diameter wherein said outside diameter of said pipe-like conduit being substantially the same as or slightly larger than the diameter of said weep hole.

3. A system as claimed in claim 2, wherein said pipe-like conduit has a length that is greater than the thickness of said sea wall at said weep hole by an amount that will allow said pipe-like conduit to protrude at least a short distance beyond said frontal side of said sea wall after said pipe-like conduit has been inserted into said weep hole so that said first conduit end is positioned flushly with said landward side of said sea wall.

4. A system as claimed in claim 1, wherein said length of said conduit is in a range from approximately 1 inch to approximately 9 inches.

5. A system as claimed in claim 1, wherein an outside diameter of said conduit is in a range from approximately 1 inch to 2 inches.

6. A system as claimed in claim 1, wherein said conduit is comprised of polyvinyl chloride.

7. A system as claimed in claim 1, wherein said conduit further comprises a longitudinally extending ridge on an inner wall of said conduit.

8. A system as claimed in claim 7, wherein said longitudinally extending ridge stops at length from said second conduit opening that is slightly greater than a length of said filter assembly.

9. A system as claimed in claim 1, wherein said protecting means is comprised of a cap-like structure that is slidably insertable over said second conduit end after said first conduit end has been inserted into said weep hole and while said pipe-like conduit is driven into said weep hole by striking said cap-like structure with an impact producing device.

10. A system as claimed in claim 1, wherein said filter assembly comprises an enclosure for insertion into said conduit, said enclosure having a first end opening and a second end opening, and a filter, wherein said filter is situated within said enclosure.

11. A system as claimed in claim 10, wherein said filter assembly includes an inner fabric bearing ring, a fabric material secured to said inner ring, an outer ring secured to said inner ring, said outer ring situated within said second end opening of said enclosure.

12. A system as claimed in claim 10, wherein said enclosure is a sleeve-like enclosure having a an outside enclosure diameter that is substantially the same as or slightly smaller than said inside diameter of said pipe-like conduit.

13. A system as claimed in claim 12, wherein said sleeve-like enclosure is provided at said first enclosure end with a plurality of projections that are situated on and extend radially inward from the inside periphery of said sleeve-like enclosure.

14. A system as claimed in claim 13, wherein said plurality of projections are each spaced equidistantly around the inner periphery of said sleeve-like enclosure.

15. A system as claimed in claim 10, wherein said enclosure further comprises a longitudinally extending groove on an outer surface of said enclosure.

16. A system as claimed in claim 10, wherein said filter is located at said second end opening of said enclosure and fully covers said second enclosure end opening.

17. A system as claimed in claim 1, wherein said filter assembly includes a filter comprised of a fabric.

18. A system as claimed in claim 17, wherein said filter has an ability to permit the passage of water and other liquid substances from said earthen embankment, through said filter and into said weep hole, and said fabric further has a capability to prevent soil included in said earthen embankment from passing through said filter.

19. A system as claimed in claim 17, wherein said fabric is a tightly woven polypropylene fabric.

20. A system as claimed in claim 1, wherein said tool assembly is comprised of a rod; an elongated handle attached to a first end of said rod; and a fastening head attached to a second end of said rod.

21. A system as claimed in claim 20, wherein said fastening head comprises a base region; a central region; and a hub-like end region.

22. A system as claimed in claim 21, wherein said hub-like end region is provided with a plurality of radially extending hub tabs, said hub tabs defining there between a plurality of hub spaces.

23. A system as claimed in claim 22, wherein said central region further comprises a means for stopping rotation of said fastening head within said filter assembly.

24. A system as claimed in claim 21, wherein said fastening head engages and disengages said filter assembly at a first end to thereby permit said filter assembly to be inserted into and removed from said pipe-like conduit.

25. A system as claimed in claim 1, further comprising a means for preventing said filter assembly from being advanced beyond said first end of said conduit.

26. A system as claimed in claim 25, wherein said means for preventing said filter assembly from being advanced beyond said first end of said conduit comprises a retaining mechanism secured to said first end of said conduit, said retaining mechanism having the ability to prevent advancement of said filter assembly without substantially obstructing passage of water or other liquid materials through said filter assembly.

27. A system as claimed in claim 25, wherein said means for preventing said filter assembly from being advanced beyond said first end of said conduit comprises a washer and nut assembly secured to said tool assembly between a handle end and a fastening head of said tool assembly.

28. A system as claimed in claim 27, wherein said washer has a diameter greater than that of said second opening of said conduit.

29. A system as claimed in claim 1, further comprising a hydraulic cement applied at a gap provided for expansion and contraction of at least two slab-like sea wall segments that comprise said sea wall.

30. A method for repairing a sea wall and preventing erosion drainage from occurring in an earthen embankment situated on a landward side of said sea wall, the method comprising the steps of:

inserting a first end of a conduit into an opening of a weep hole on side of said sea wall opposite said landward side;

applying a means for protecting said conduit from deformation as said conduit is inserted into said weep hole over a second conduit end of said conduit;

striking said protector means with an impact producing device to drive said conduit into said weep hole until said first conduit end is flushly positioned with respect to said landward side of said sea wall and the second conduit end protrudes at least a short distance from said frontal side;

removing said protector means from said second conduit end;

attaching a filter assembly to a fastening head of a rod-like tool assembly; and slidably moving said tool assembly and said filter assembly within said conduit until the end of said filter assembly is positioned flushly with a first conduit opening at said first conduit end of said conduit.

31. A method as claimed in claim 30, further comprising optionally inwardly reaming a weep hole from a frontal side of said sea wall with a drill; optionally scraping a gap provided for expansion and contraction between at least two slab-like sea wall segments that comprise said sea wall and an adjusting area of said frontal side of said sea wall extending to the left and right of said gap; and optionally sealing said gap with a hydraulic cement.

32. A method as claimed in claim 30, further comprising disconnecting said filter assembly from said rod-like tool assembly and withdrawing said rod-like tool assembly from said conduit through said second conduit opening.

33. A method as claimed in claim 30, wherein said step of attaching said filter assembly to said fastening means of said rod-like tool assembly further includes the steps of:

aligning a plurality of hub spaces defined by a plurality of radially extending hub tabs provided on a hub-like end region of said fastening head with a plurality of projections provided at a first end of said filter assembly;

inserting said hub-like end region into said filter assembly until said first end of said filter assembly comes to rest against a base region of said fastening head; and rotating said plurality of projections and said plurality of hub tabs relative to each other until a side of one of the projections contacts a radially projecting stop provided on a central region situated between said hub-like end region and said base region of said fastening head.

34. A method as claimed in claim 33, wherein said step of disconnecting said filter assembly from said fastening head of said rod-like tool assembly further includes the steps of:

rotating said plurality of projections and said plurality of hub tabs relative to each other in a direction opposite to that required to attach said filter assembly and said fastening head until said plurality of hub spaces defined by said plurality of hub tabs is aligned with said plurality of projections;

withdrawing said plurality of hub tabs from said filter assembly.

35. A method as claimed in claim 30, further comprising aligning a longitudinal groove on an outer surface of said filter assembly with a longitudinal ridge on an inner surface of said conduit in order to slidably move said tool assembly and said filter assembly within said conduit.

36. A method for repairing a sea wall and preventing erosion drainage from occurring in an earthen embankment situated on a landward side of said sea wall, the method comprising the steps of:

attaching a filter assembly to a fastening head of a rod-like tool assembly;

inserting said rod-like tool assembly and said filter assembly into a conduit situated in a weep hole of said sea wall;

slidably moving said tool assembly and said filter assembly within said conduit until said filter assembly is positioned flushly at a first conduit opening at a first conduit end of said conduit, said first conduit end being situated at said landward side of said sea wall;

disconnecting said filter assembly from said rod-like tool assembly;

withdrawing said rod-like tool assembly from said conduit through a second conduit opening at a second conduit end of said conduit, said second conduit end being situated at a frontal side of said sea wall.

37. A device for repairing a sea wall and preventing erosion drainage from occurring in an earthen embankment situated on a landward side of the sea wall, the device comprising:

a conduit for insertion into a weep hole connecting said landward side of said sea wall with an opposite frontal side of said sea wall, said conduit having a first end and a second end, wherein said first end of said conduit is inserted into said weep hole and said second end of said conduit extends at least a short distance out of said weep hole on said frontal side of said sea wall; and a removable filter assembly positioned proximate to said first end of said conduit.

38. The device as recited in claim 37, further comprising: means for preventing said filter from inadvertently sliding out of said second end of said conduit.

39. The device as recited in claim 37, further comprising: means for preventing said conduit from being advanced too far through said weep hole.

40. The device as recited in claim 39 wherein said means for preventing said conduit from being advanced too far through said weep hole is selected from the group consisting of distance markers printed on an outer surface of said conduit and a flange extending from at least one side of an outer surface of said conduit.

* * * * *